(12) United States Patent
Costa

(10) Patent No.: US 10,677,316 B2
(45) Date of Patent: *Jun. 9, 2020

(54) CLEVIS MOUNT THIMBLE

(71) Applicant: Factor 55, LLC, Boise, ID (US)

(72) Inventor: Michael Douglas Costa, Boise, ID (US)

(73) Assignee: FACTOR 55, LLC, Boise, ID (US)

( * ) Notice: Subject to any disclaimer, the term of this patent is extended or adjusted under 35 U.S.C. 154(b) by 313 days.

This patent is subject to a terminal disclaimer.

(21) Appl. No.: 15/338,174

(22) Filed: Oct. 28, 2016

(65) Prior Publication Data

US 2017/0122405 A1    May 4, 2017

Related U.S. Application Data

(60) Provisional application No. 62/248,055, filed on Oct. 29, 2015.

(51) Int. Cl.
*F16G 11/12* (2006.01)

(52) U.S. Cl.
CPC .................................. *F16G 11/12* (2013.01)

(58) Field of Classification Search
CPC ........ F16G 11/146; F16G 11/14; F16G 15/06; F16G 11/12; Y10T 403/4336
See application file for complete search history.

(56) References Cited

U.S. PATENT DOCUMENTS

| | | | |
|---|---|---|---|
| 341,101 A | 5/1886 | Frederick | |
| 421,120 A | 2/1890 | Young | |
| 1,184,891 A | 5/1916 | Sunderland | |
| 1,222,997 A | 4/1917 | Rottmer | |
| 1,392,138 A | 9/1921 | Freeman et al. | |
| 1,686,288 A | 10/1928 | Meals | |
| 1,859,143 A | 5/1932 | Howe | |
| 2,152,096 A | 3/1939 | Russell | |
| 2,275,162 A | 3/1942 | Sutthoff | |
| 2,443,155 A | 6/1948 | Zahutnik | |
| 2,476,731 A | 7/1949 | Hobbs | |
| 2,687,899 A | 8/1954 | Bendtsen | |

(Continued)

FOREIGN PATENT DOCUMENTS

| GB | 1486067 A | 9/1977 |
|---|---|---|
| JP | 8-217362 A | 8/1996 |

*Primary Examiner* — Robert Sandy
*Assistant Examiner* — Louis A Mercado
(74) *Attorney, Agent, or Firm* — Dorsey & Whitney LLP

(57) ABSTRACT

A thimble apparatus for use with a rope has a thimble eye formed as a generally U-shaped shackle defining a center aperture therein with arms on opposing sides of the aperture. The thimble eye has an outer surface, a front face, and a rear face. A groove is formed within the front face of the shackle generally in the shape of a U and has a width. A rope seat is formed within the shackle beneath the groove proximal to the rear face and has a diameter larger than the width of the groove. The groove forms a passage to the rope seat from the front face along the length of the groove. A base connects to ends of the arms of the shackle closing the aperture. The base defines a first feed channel formed as a first bore through the base that connects with a first end of the rope seat and a second feed channel formed as a second bore through the base that connects with a second end of the rope seat.

13 Claims, 17 Drawing Sheets

(56) References Cited

U.S. PATENT DOCUMENTS

| | | | |
|---|---|---|---|
| 2,835,528 | A | 5/1958 | McCarthy et al. |
| 2,904,906 | A | 9/1959 | Smith |
| 3,269,109 | A | 8/1966 | Hart |
| 4,005,904 | A | 2/1977 | Weman et al. |
| 4,225,172 | A | 9/1980 | Marquardt |
| 4,414,712 | A | 11/1983 | Beggins |
| 5,058,243 | A | 10/1991 | Rasmussen |
| 5,336,846 | A | 8/1994 | Sachs |
| 6,094,783 | A | 8/2000 | Parsons |
| 6,158,760 | A | 12/2000 | Kiss |
| 6,282,879 | B1 | 9/2001 | Bonaiti et al. |
| 6,312,004 | B1 | 11/2001 | Kiss |
| 6,536,794 | B2 | 3/2003 | Hancock et al. |
| 6,948,734 | B2 | 9/2005 | Popham |
| 7,393,033 | B1 | 7/2008 | Bisso, IV |
| 7,654,594 | B2 | 2/2010 | Bisso, IV |
| D615,006 | S | 5/2010 | Goodman et al. |
| D615,844 | S | 5/2010 | Wiora |
| 7,871,097 | B2 | 1/2011 | Sparkes et al. |
| 8,328,223 | B2 | 12/2012 | Leinenger |
| 9,388,025 | B2 | 7/2016 | Costa |
| 2004/0129841 | A1* | 7/2004 | Franks, Jr. ............ H02G 7/056 248/58 |
| 2004/0227324 | A1 | 11/2004 | Popham |
| 2005/0279977 | A1 | 12/2005 | Kerry |
| 2006/0087101 | A1 | 4/2006 | Yon |
| 2006/0103111 | A1 | 5/2006 | Popham |
| 2009/0008953 | A1 | 1/2009 | Bisso, IV |
| 2010/0011678 | A1 | 1/2010 | Kelly |
| 2010/0281656 | A1 | 11/2010 | Naquin et al. |
| 2017/0122405 | A1 | 5/2017 | Costa |
| 2017/0227089 | A1 | 8/2017 | Costa |

* cited by examiner

CLEVIS MOUNT THIMBLE

CROSS REFERENCE TO RELATED APPLICATIONS

This application claims priority to U.S. provisional application No. 62/248,055 filed on 29 Oct. 2015 and incorporates its disclosure in its entirety.

TECHNICAL FIELD

This invention relates generally to rigging and more specifically to splice-on shackle or clevis mount thimbles.

BACKGROUND

Synthetic rope and wire rope assemblies are used in various rigging applications including winching and hoisting. Clevis mount thimbles may be used in wire rope and synthetic rope assemblies to form and reinforce an eye shape or loop at an end of a cable or rope. The eye shape or loop at the end of the rope allows the user to attach various pieces of hardware to the end of the thimble. Examples of hardware pieces includes hooks, shackles, and other rigging interface hardware. Synthetic ropes may have high tensile strength but are vulnerable to abrasion and ultra-violate (UV) sunlight damage. Current rope thimbles are capable of being crushed, which may result in the eye shape or loop distorting and reducing its opening size. Current solid thimble designs may not protect the synthetic rope from abrasions or UV damage due to the open design of thimbles. Also, current solid thimble designs do not provide a fairlead engagement surface to positively stop both the cable and solid thimble from being pulled through the winch fairlead opening, which can damage the fairlead opening. A need may exist for a solid thimble which protects the rope from environmental damage and distortion of the eye shape, as well as protect the fairlead opening from damage when operating the winch.

The information included in this Background section of the specification, including any references cited herein and any description or discussion thereof, is included for technical reference purposes only and is not to be regarded subject matter by which the scope of the invention is to be bound.

SUMMARY

One illustrative embodiment of the present disclosure may include a thimble apparatus for use with a rope. The thimble may have a thimble eye formed as a generally U-shaped shackle defining a center aperture therein with arms on opposing sides of the aperture. The thimble eye may have an outer surface, a front face, and a rear face. A groove may be formed within the front face of the shackle generally in the shape of a U and having a width. A rope seat may be formed within the shackle beneath the groove proximal to the rear face and having a diameter larger than the width of the groove. The groove may form a passage to the rope seat from the front face along the length of the groove. A base may be connected to ends of the arms of the shackle closing the aperture. The base may further define a first feed channel and a second feed channel. The first feed channel may be formed as a first bore through the base that connects with a first end of the rope seat. The second feed channel may be formed as a second bore through the base that connects with a second end of the rope seat.

In another illustrative embodiment, a thimble apparatus for reinforcing a spliced eye in a rope is disclosed. The thimble apparatus has a thimble eye formed as a generally U-shaped shackle defining a center aperture therein with arms on opposing sides of the center aperture. The thimble eye may further have an outer surface, a front face, and a rear face. The thimble eye may further define a groove formed within the front face of the shackle generally in the shape of a U and having a width. The thimble eye may also define a rope seat formed within the shackle beneath the groove proximal to the rear face. The diameter of the rope seat may be larger than the width of the groove. The groove forms a passage to the rope seat from the front face along the length of the groove. A base connects to ends of the arms of the shackle to close the center aperture. The base further defines a first feed channel, a second feed, and a plurality of sockets. The first feed channel may be formed as a first bore through the base that connects with a first end of the rope seat. The second feed channel may be formed as a second bore through the base that connects with a second end of the rope seat. The sockets may be formed as blind holes in an engagement surface of the base opposite from the ends of the arms of the shackle. A bumper may have a plurality of posts extending normally from a surface thereof and defining a rope aperture. When the surface of the base defining the sockets and the bumper are coupled together, the plurality of posts align with the plurality of sockets, and the rope aperture aligns with the first feed channel and the second feed channel.

In yet another exemplary implementation, a method of manufacturing a thimble is disclosed. A thimble eye may be formed out of a block of material as a generally U-shaped shackle defining a center aperture therein with arms on opposing sides of the center aperture, and having an outer surface, a front face, and a rear face. A base may be formed extending from ends of the arms of the shackle closing the center aperture. A groove with a width may be formed into a front face of the shackle generally in the shape of a U. A first access aperture may be formed in the front face of the shackle adjacent to a first end of the groove having a diameter larger than the width of the groove. A second access aperture may be formed in the front face of the shackle adjacent to a second end of the groove having a diameter larger than the width of the groove. A rope seat may be formed within the shackle beneath the groove proximal to the rear face with a diameter greater than the width of the groove and less than or equal to the diameters of the first and second access apertures. A first feed channel may be formed as a first bore through the base that connects with a first end of the rope seat. A second feed channel may be formed as a second bore through the base that connects with a second end of the rope seat.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings

DETAILED DESCRIPTION

An embodiment of a thimble assembly described herein may include a partially open thimble and a bumper coupled to a rope. In some examples, the thimble may have a thimble eye and a base, with a rope seat formed through both the thimble eye and the base. The rope seat may connect a first feed channel and a second feed channel. In some examples, the rope seat may be configured to accept a first end of rope routed through the thimble that is first fed into the first feed channel and routed through the rope seat and out of the thimble through the second feed channel. After being routed through the thimble, the first end of the rope may be spliced with an intermediate section to form a loop. The configuration of the rope seat may protect the rope installed within the thimble from abrasion and UV radiation damage.

In some examples, the bumper may be coupled to the base of the thimble. The bumper may be configured to prevent the thimble from directly contacting a fairlead, thereby potentially protecting the fairlead from damage.

Thimble Assembly

Figure 1:
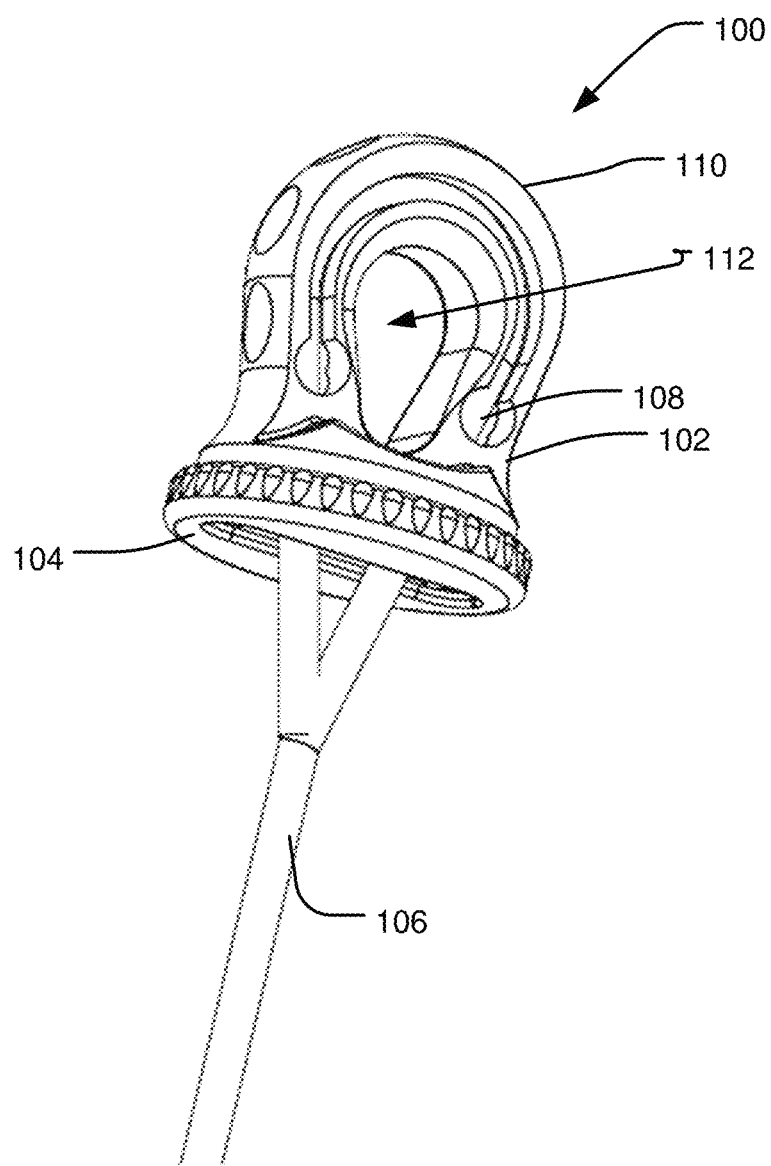
FIG. 1 is an isometric view of a thimble assembly.

FIG. 1 is an isometric view of a thimble assembly 100 with a rope 106. FIG. 1 shows the thimble assembly 100 with a thimble 102, a bumper 104, and a rope 106. The thimble 102 may form a thimble eye 110 as a U-shaped shackle with arms that define a hardware mount aperture 112 therethrough. In some embodiments, the thimble 102 may be made as a machined or cast metal piece, for example, steel, aluminum, titanium, or other metal of sufficient tensile strength. In some examples, the rope 106 has a rope eye 108 seated within the thimble eye 110 that generally surrounds the hardware mount aperture 112. In the example of FIG. 1, the rope 106 is coupled to the thimble 102 and then spliced together to form the rope eye 108.

Figure 2:
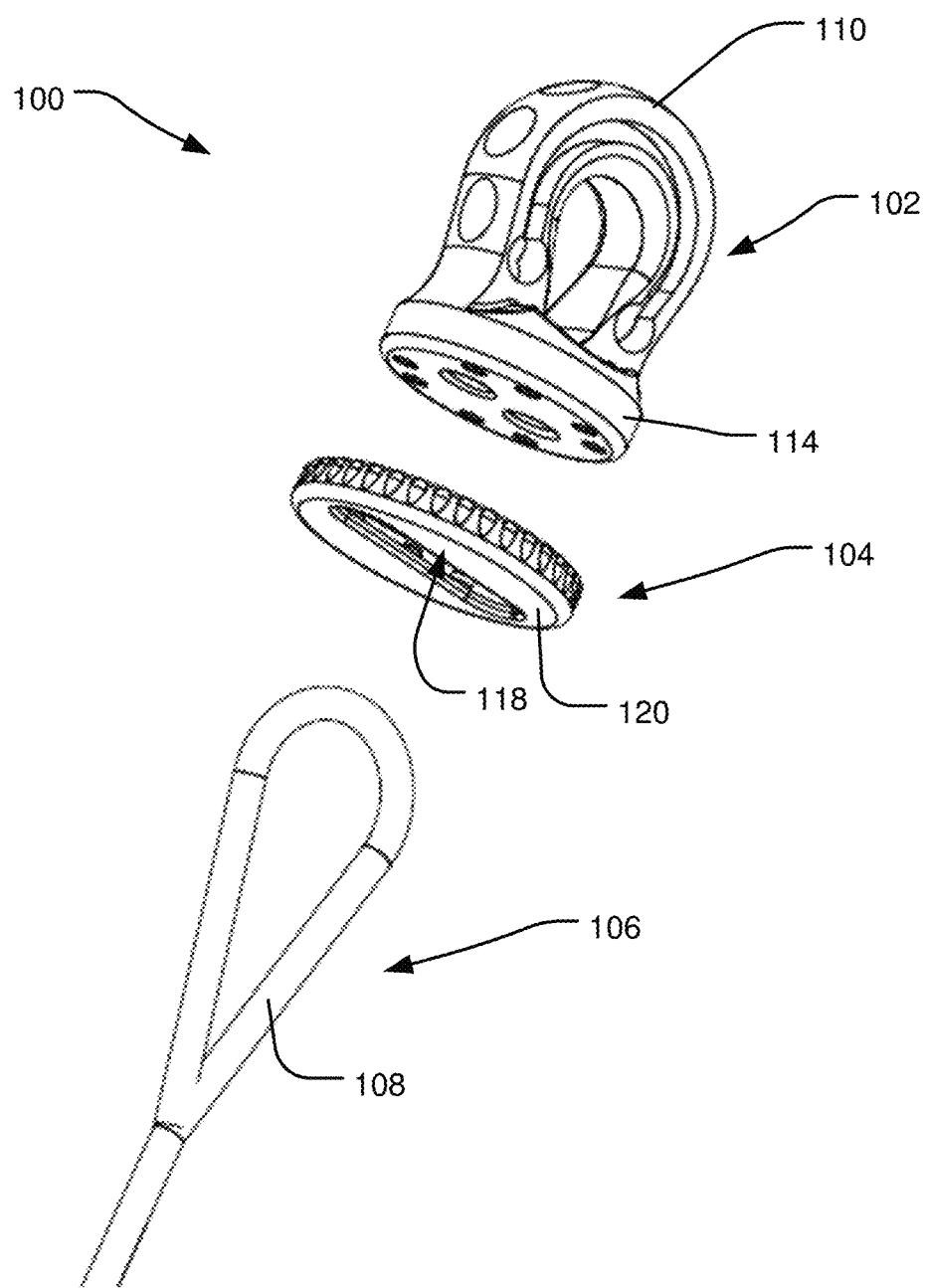
FIG. 2 is an isometric exploded view of the assembly of FIG. 1.

FIG. 2 is an isometric exploded view of the assembly of FIG. 1. FIG. 2 shows the thimble 102 with a thimble eye 110 extending normally from one side of a disk-shaped base 114. The base 114 may define a planar engagement surface 116 opposite the thimble eye 110. The bumper 104 defines a rope aperture 118 within an engagement surface 120. The rope 106 has a rope eye 108 that may be formed by splicing an end of the rope 106 within an intermediate length of rope 106 after the end of the rope 106 is threaded through the thimble 102.

Thimble

Figure 3:
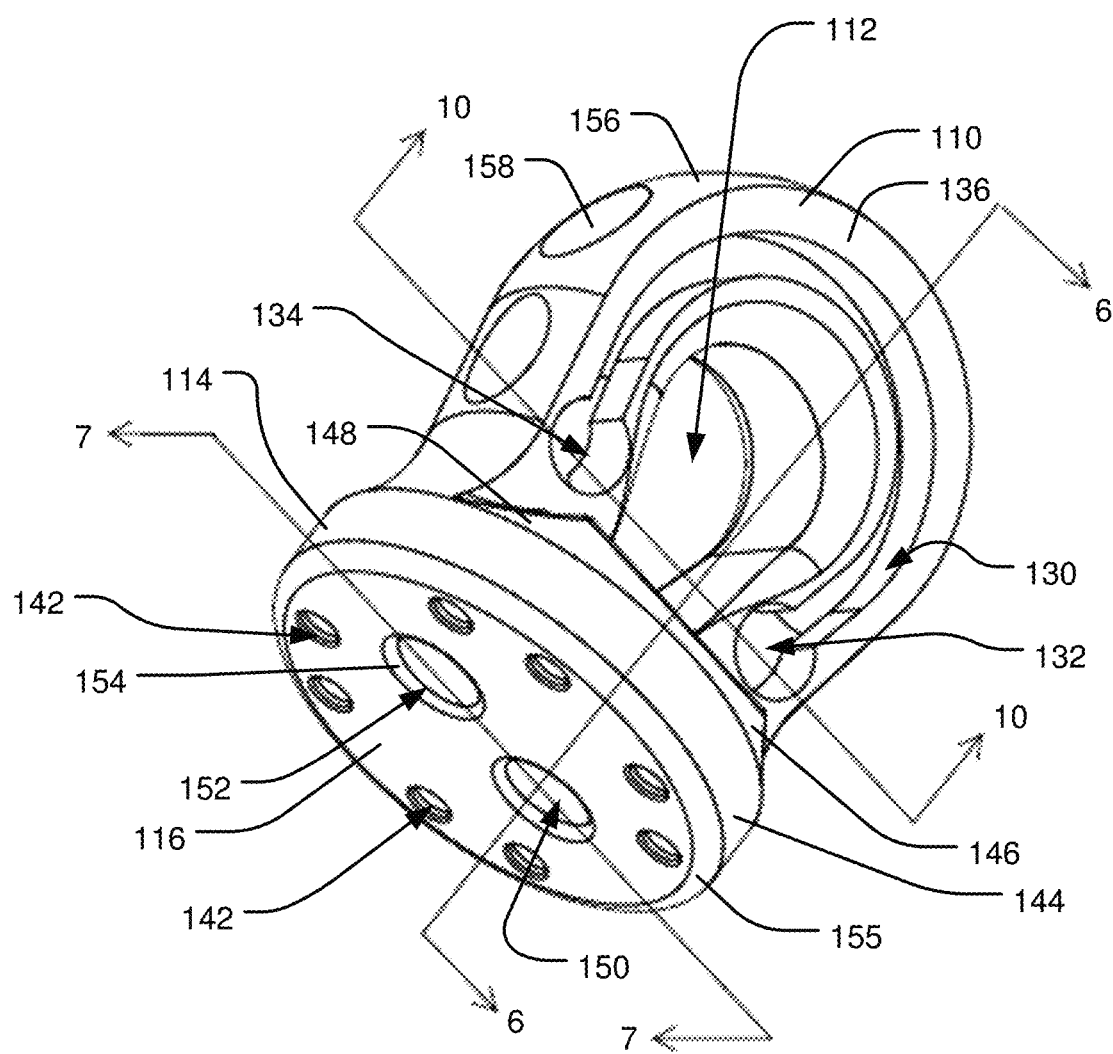
FIG. 3 is an isometric view of a thimble.
Figure 4:
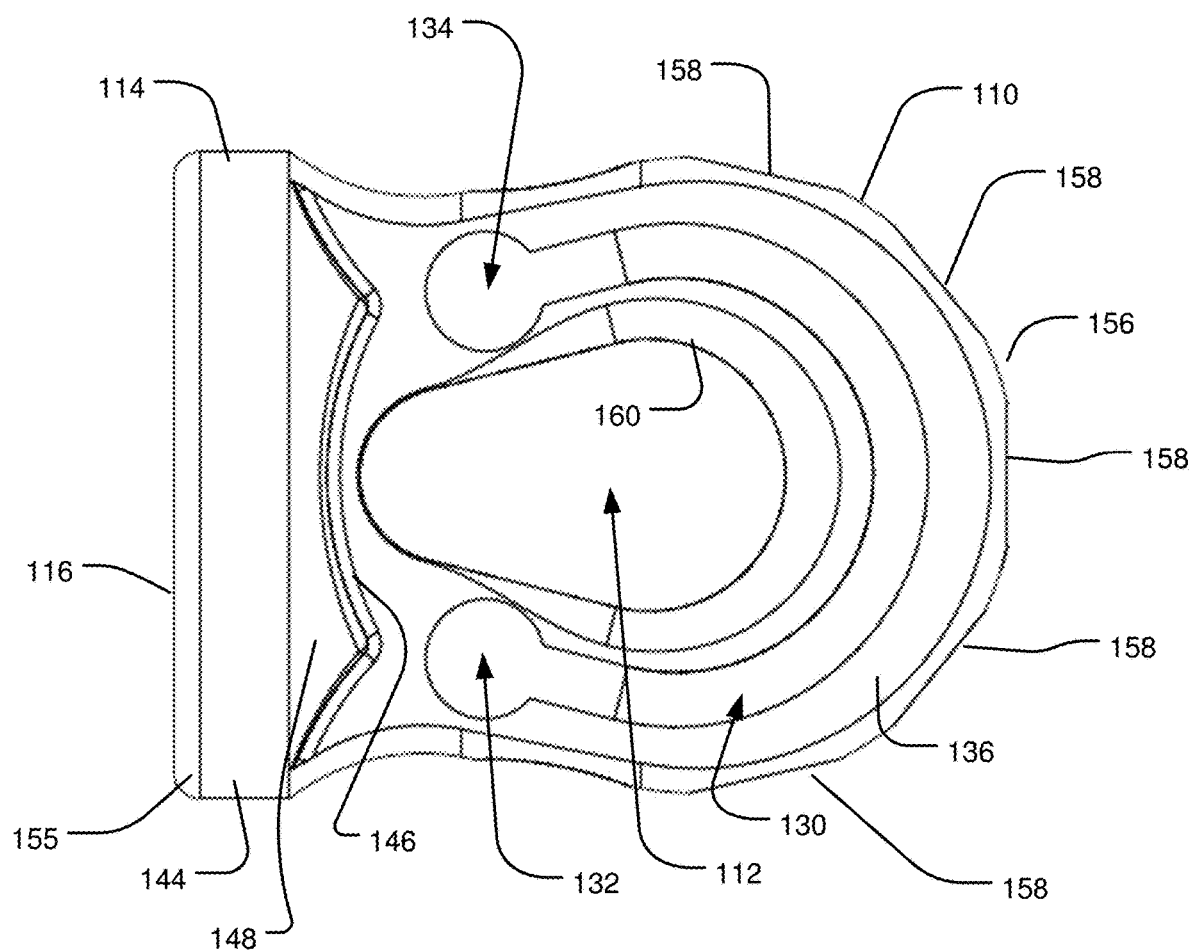
FIG. 4 is a front elevation view of the thimble of FIG. 3.
Figure 5:
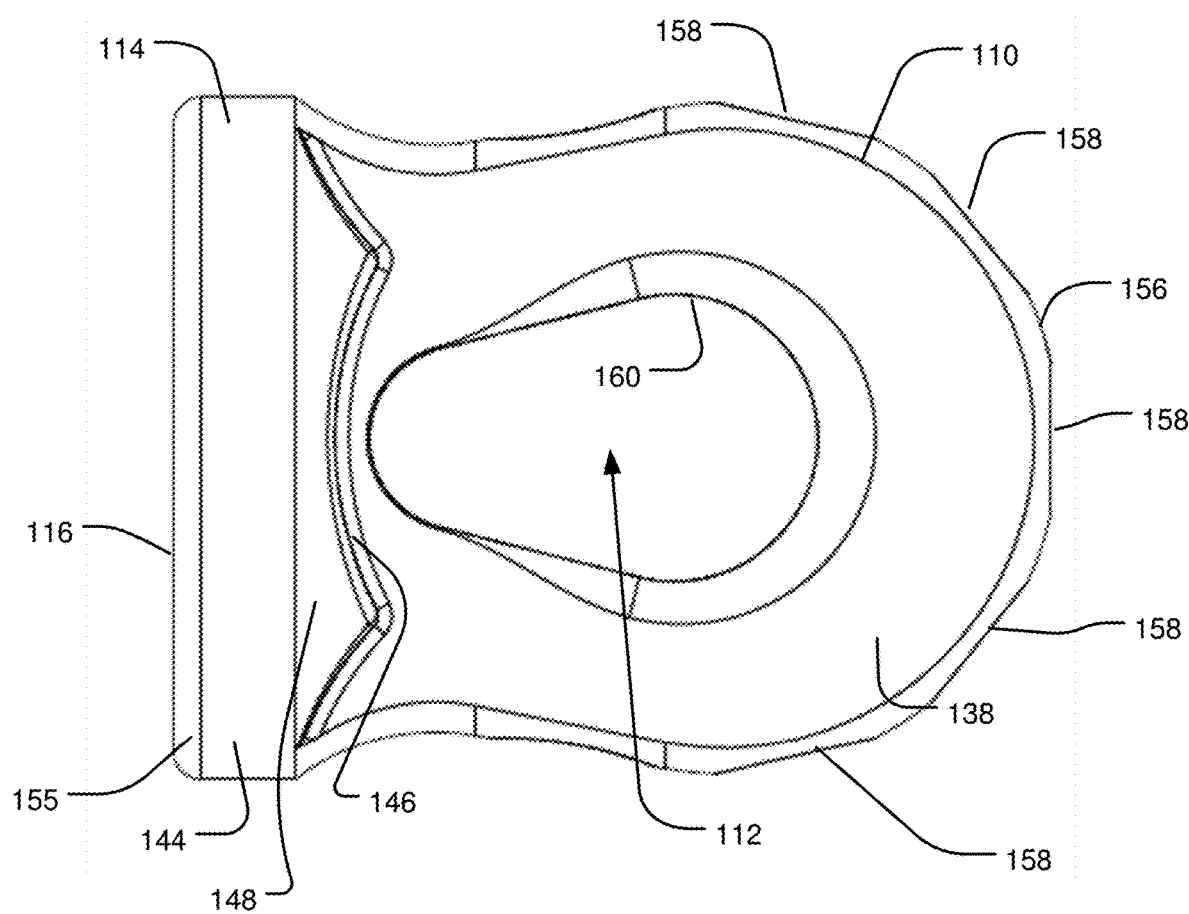
FIG. 5 is a rear elevation view of the thimble of FIG. 3.

FIGS. 3-8 show various views of the thimble 102. FIG. 3 is an isometric view of the thimble 102 depicting a thimble eye 110 in the form of a in a looped or U-shaped shackle with generally parallel arms to define a hardware mount aperture 112 between the shackle arms of the thimble eye 110 and the base 114. In some examples, the thimble eye 110 may have a front face 136 with a groove 130 formed within it and an opposite rear face 138. A first access aperture 132 may be formed in the front face 136 adjacent to a first end of the groove 130 and a second access aperture 134 may be formed in the front face 136 adjacent to a second end of the groove 130. The groove 130 may connect the first access aperture 132 with the second access aperture 134. The first access aperture 132, the second access aperture 134, and the groove 130 may each may have a depth that extends into the thimble eye 110 towards the rear face 138 of the thimble eye 110. FIG. 5 is a rear view of the thimble of FIG. 3 which shows the rear face 138 of the thimble eye 110. In some examples, the rear face 138 may differ from the front face 136 in that the rear face 138 is smooth and does not have the first access aperture 132, the second access aperture 134, or the groove 130.

In some examples, the hardware mount aperture 112 may be formed as a through channel that extends from the front face 136 to the rear face 138 of the thimble eye. The hardware mount aperture 112 may be shaped as a tear drop, circle, oval, rectangle, or oblong shape within the thimble eye 110.

Figure 6:
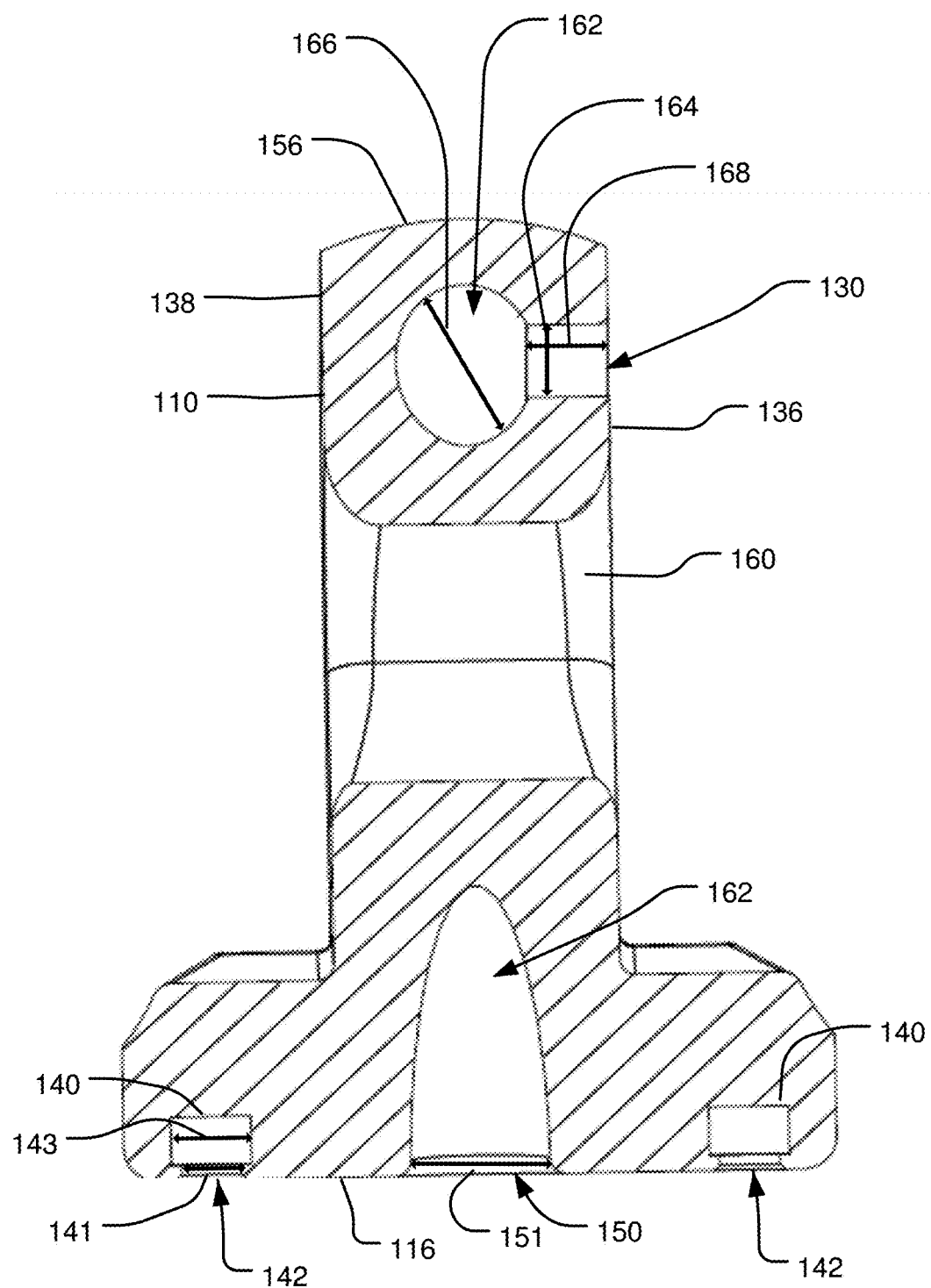
FIG. 6 is an isometric cross-sectional right side view of the thimble along line 6-6 of FIG. 3.

FIG. 4 is a front view of the thimble 102 of FIG. 3. FIG. 5 is a rear view of the thimble of FIG. 3. FIG. 6 is an isometric, cross-sectional, right side view of the thimble 102 along line 6-6 of FIG. 3. As shown in FIGS. 4-6, in some examples, a curved outer surface 156 may extend between the front face 136 and the rear face 138 of the thimble 102, which together form the U-shape of the thimble eye 110. The outer surface 156 may be a convexly curved surface that extends towards the base 114. The outer surface 156 may have dimple features 158 formed therein that may be spaced along a length of the outer surface 156. In some examples, the dimple features 158 may be circular in shape. Each dimple feature 158 may be substantially normal to the front face 136. In some examples, the dimple features 158 may be flat and in some examples, the features 158 may be concavely curved inwards towards the hardware mount aperture 112. The dimple features 158 may provide surfaces for greater ease of a user in firmly grasping and holding the thimble 102.

As shown in FIG. 4, an interior surface 160, the hardware mount surface 146, the groove 130, and the outer surface 156 of the thimble eye 110 may form the shape of the hardware mount aperture 112. In some examples, the interior surface 160 is adjacent to the hardware mount aperture 112.

As shown in FIG. 4, in some examples, the thimble eye 110 extends from opposing edges of the base 114. The base 114 may have a hardware mount surface 146 opposite the engagement surface 116 from which the thimble eye 110 extends. A chamfered surface 148 may be formed on the hardware mount surface 146 adjacent to a cylindrical perimeter edge 144 of the base 114. A chamfered surface 155 may be formed adjacent to the perimeter edge 144 to transition to the engagement surface 116. The engagement surface 116 may be formed on an opposite side of the hardware mount surface 146.

As shown in FIG. 3, the engagement surface 116 may be generally planar and generally normal to a plane traveling through the front face 136 of the thimble eye 110. A plurality of neck openings 142 may be formed in the engagement surface 116 of the base 114. In some examples, each neck opening 142 may connect a socket 140 with the engagement surface 116. As shown in FIG. 6, in some examples, the neck openings 142 transition to the sockets 140 that extend towards the thimble eye 110. In some examples, the sockets 140 may be cylindrically shaped with a diameter 143 located proximal to the thimble eye 110 and are of a larger diameter than the diameter 141 of the neck openings 142, which may be circular or annular. In some examples, the neck openings 142 and sockets 140 may be shaped as rectangles, ovals, triangles, or other oblong shapes.

FIG. 6 shows the thimble eye 110 and base 114 while exposing a rope seat 162 connected to the groove 130 formed in the front face 136. In some examples, the rope seat may be a tunnel or a channel within the thimble eye 110. In some examples, the rope seat 162 follows the U-shaped path of the groove 130 such that the rope seat 162 is adjacent the groove 130 between the first access aperture 132 and the second access aperture 134. The rope seat 162 may have a diameter 166 and the groove 130 may have a width 164 and a depth 168. In some examples, the diameter 166 of the rope seat is greater than the width of the groove 130. The diameter 166 of the rope seat 162 may be sufficient to receive rope diameters in the range of 0.25 in. to 6 in. The diameter may be chosen to be slightly larger than the diameter of the rope to be received within the rope seat 162. In illustrative implementations, the width 164 of the groove 130 may be in the general range of 2 to 3 times narrower than the diameter of the rope seat 162. The rope seat 162 may be centered within the thimble eye 110, i.e., the rope seat 162 may be bisected by a plane centered between the front face 136 and the rear face 138. The thickness of the thimble eye 110 may be chosen based upon the diameter of the rope seat in order to provide a depth 168 of the groove 130 may be such that the corresponding thickness of the front face 136 above the rope channel 162 on each side of the groove 130 is sufficiently strong to resist rated tension and load forces for the size of the thimble assembly 100.

Figure 7:
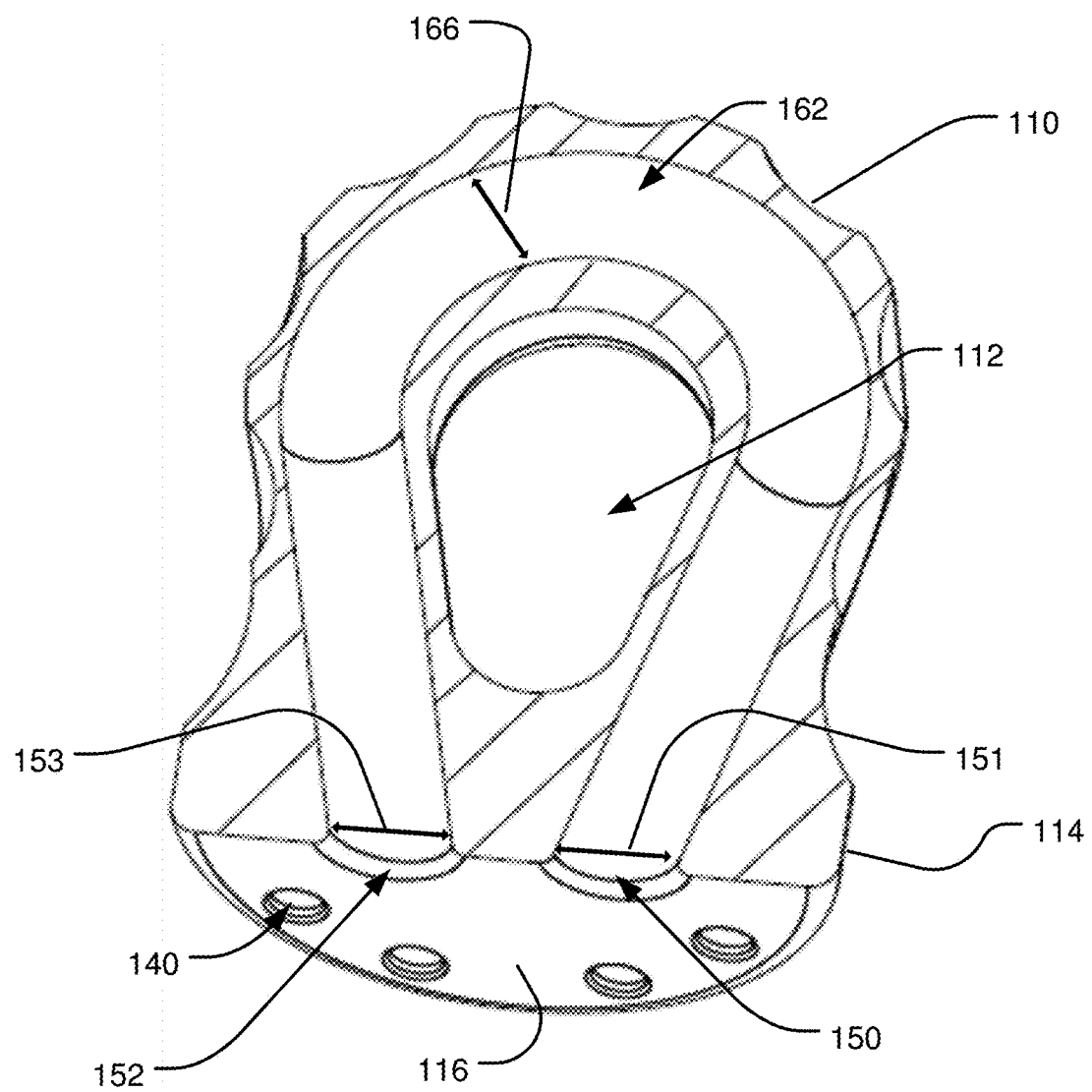
FIG. 7 is a front cross-sectional view of the thimble along line 7-7 of FIG. 3.

As shown in FIG. 3, a first feed channel 150 and a second feed channel 152 may be formed in the engagement surface 116. Each feed channel 150, 152 may have a chamfered surface 154 around its entry perimeter. FIG. 7 is a cross-sectional, front view of the thimble of FIG. 3 along line 7-7. FIG. 7 shows the continuous rope seat 162 formed within the thimble 102 that connects the first feed channel 150 and the second feed channel 152.

In some examples, the first feed channel 150 has a diameter 151 and the second feed channel 152 has a diameter 153. In some examples, the diameters 151, 153 of the first and second feed channel 150, 152 are similar. In some examples, the diameters 151, 153 of the first and second feed channel 150, 152 are dissimilar with diameter 151 being larger than or smaller than 153. In some examples, the diameter 151 is similar to the diameter 166 of the rope seat 162. As shown in FIG. 7, in some examples, the cross-sectional length of the rope seat 162 is U-shaped. In some examples, the cross-sectional length of the rope seat 162 is shaped similar to a portion of the rope eye 108 shown in FIG. 2.

Figure 8:
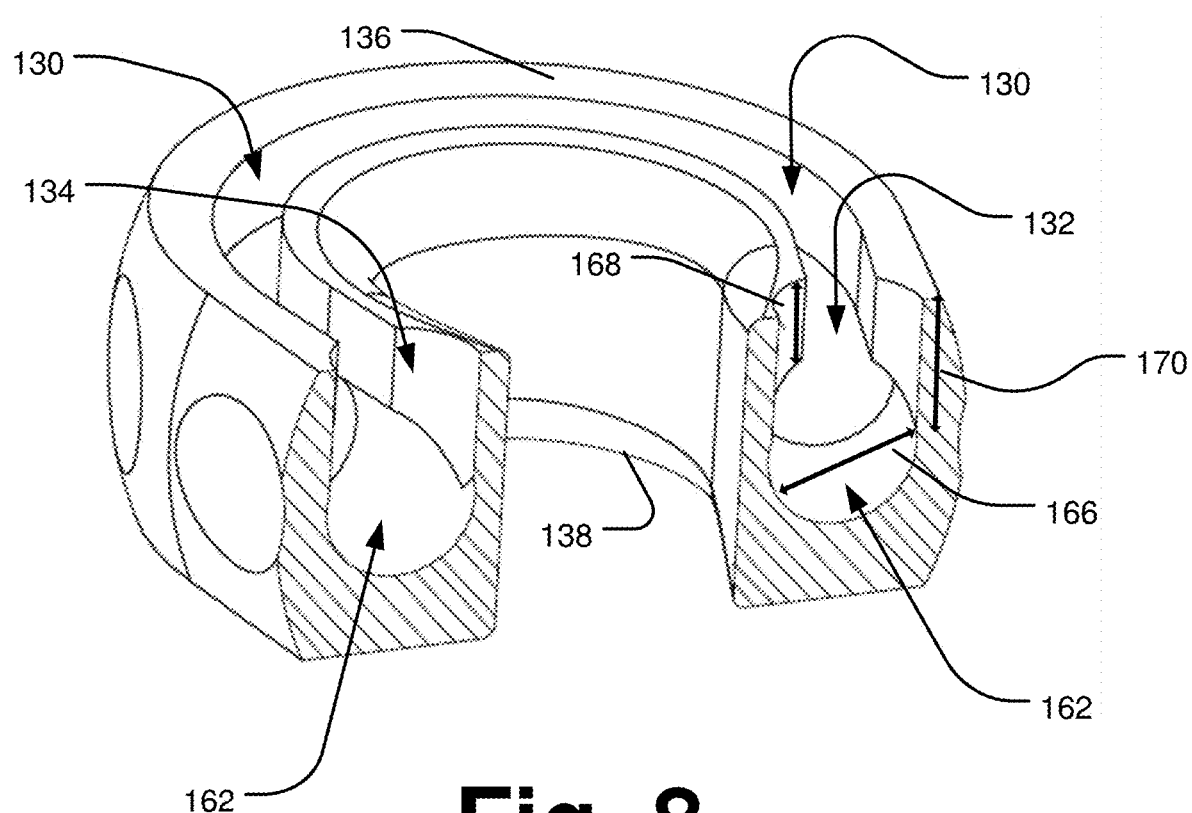
FIG. 8 is a cross-sectional view of the thimble along line 8-8 of FIG. 3.

FIG. 8 is a cross-sectional view of the thimble 102 along line 8-8 of FIG. 3. FIG. 8 shows the first access aperture 132 and the second access aperture 134 connected to both the groove 130 and the rope seat 162. In some examples, the access apertures 132, 134 are formed as blind bore holes through the front face 136 towards the rear face 138. In some examples, the first and second access apertures 132, 134 are circular. In some examples, the first and second access apertures 132, 134 may have similar or equivalent diameters. In some examples, the diameter of the first and second access apertures 132, 134 may be similar or equivalent to the diameter of the rope seat 162. In some examples, the access apertures 132, 134 may have a depth 170 that is smaller than the distance of the depth 168 of the groove 130 and half the diameter 166 of the rope seat 162.

Bumper

Figure 9:
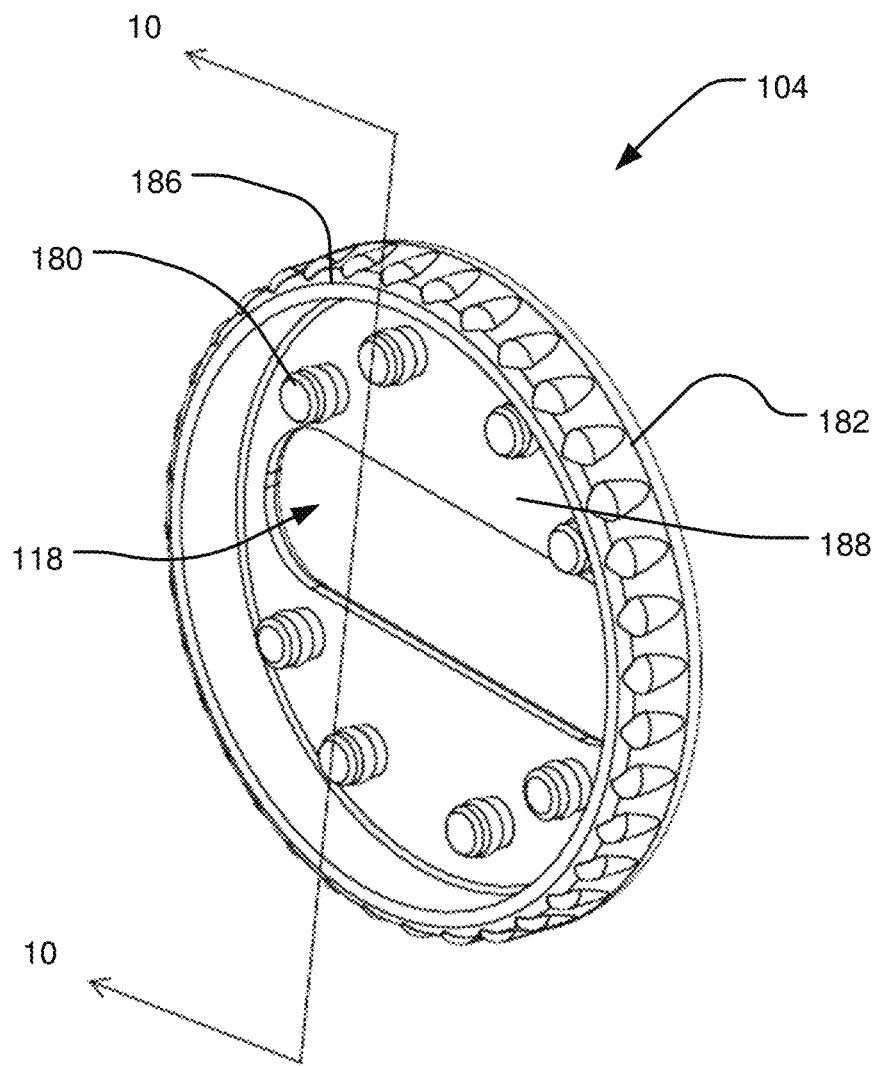
FIG. 9 is an isometric view of a bumper.
Figure 10:
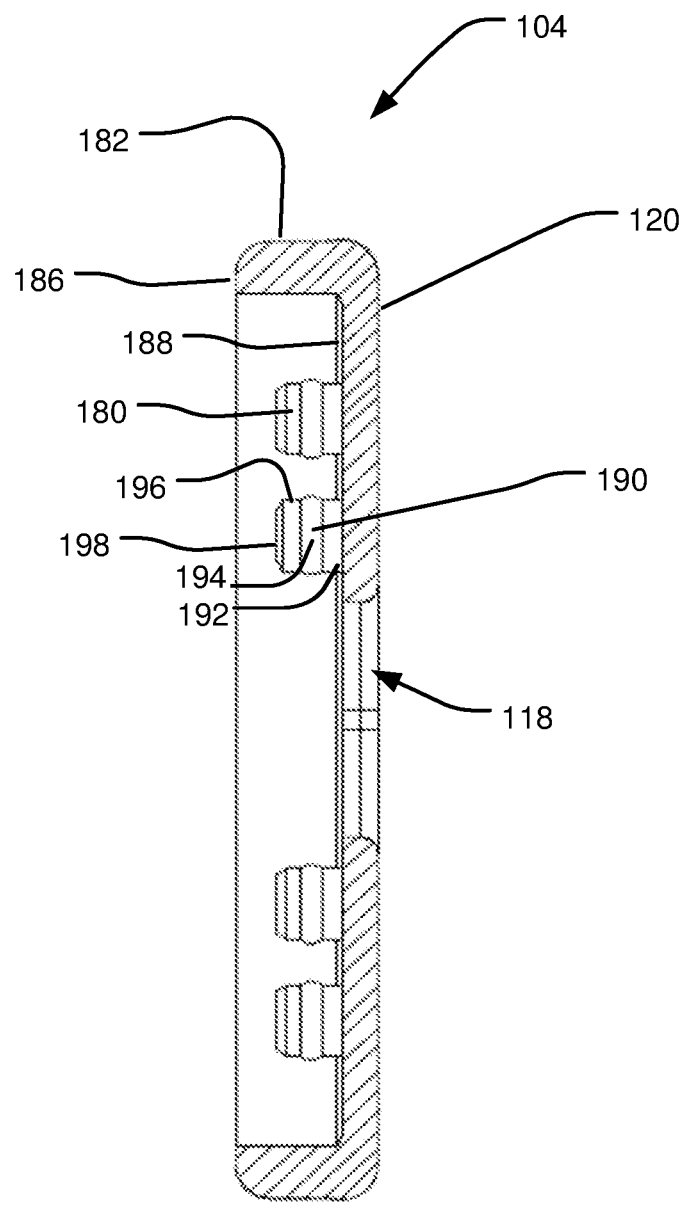
FIG. 10 is a cross-sectional side view of the bumper along line 10-10 of FIG. 9.

FIGS. 9 and 10 show the bumper 104. The bumper 104 may be a generally disk-shaped component that fits on the engagement surface 116 of the thimble 102. The bumper 104 may be formed from an elastomeric material such as rubber, and formation processes may include molding, injection molding, and the like.

The bumper 104 may have an engagement surface 120, a perimeter wall 182, and a mating face 182. FIG. 9 shows the bumper 104 with a perimeter wall 182. In some examples, the mating face 188 constitutes an opposing side of the engagement surface 120. The mating face 188 may be parallel to a plane defining an edge 186 of the perimeter wall 182. FIG. 10 is a cross-sectional side view of the bumper 104 along line 10-10 of FIG. 9. FIG. 10 shows the bumper 104 with the edge 186 adjacent the perimeter wall 182, with the perimeter wall 182 extending normally from and about the perimeter of the engagement surface 120. In some examples, the mating face 188 is parallel with the engagement surface 120.

In some examples, the bumper 104 may have a rope aperture 118 formed between the mating face 188 and the first face 184, as shown in FIG. 10. In some examples, the rope aperture 118 may be shaped as an oval or as a rectangle with two rounded ends. In some examples, the perimeter wall 182 may be cylindrically shaped and an outer surface that is textured. The rope aperture 118 may be sized and configured to align with the first and second access apertures 132, 134 in the base.

A plurality of posts 180 may extend normally from the mating face 188 parallel with perimeter wall 182. In some examples, the number of posts 180 is the same as the number of neck openings 142 in the engagement surface 116 of the base 114 of the thimble 102. In some examples, the posts 180 are generally cylindrically shaped. In some examples, each post 180 may have a first section 192, a second section 194, a third section 196, and a fourth section 198. The second section 194 may be a rib 190 that has a diameter larger than the diameters of the first section 192 and the third section 196. In some examples, the fourth section 198 may taper to a smaller diameter than that of the third section 196. The first section 192 may have a diameter that is similar to the diameter of the neck opening 142 in the base 114 of the thimble 102. In some examples, the rib 190 may have a diameter similar to the second diameter 143 of the socket 140.

Manufacturing

To create the thimble 102, a variety of manufacturing forming processes may be used including casting, machining, forging, extrusion, or similar processes. Materials used to form the thimble 102 include aluminum, steel, or titanium. In some examples, a block of selected material may be machined by a drill press or CNC machine. A planar face may be machined into the block of material, forming the engagement surface 116 of the base 114. Cylindrical cutting bits may then be used to form the first feed channel 150, the second feed channel 152, the chamfered surface 154 and to form a portion of the rope seat 162 that is located within the base 114.

In some examples, cutting bits may then be used to form the neck openings 142 and drill out the depth of the socket 140. After the formation of the neck openings 142 and a portion of the socket 140, an under cut cutter may then be used to remove additional material and form the diameter 143 of the socket 140.

The block of material may then be coupled to a lathe wherein the overall shape of the thimble eye 110 may be machined, including the perimeter edge 144 and chamfered surfaces 148, 155 of the base 114. The block of material may then be returned to the mill or CNC machine to remove material to create the front face 136, the rear face 138, the hardware mount surface 146, the dimple features 158, and the hardware mount aperture 112.

In some examples, the groove 130 may be machined into the front face 136 to a depth smaller than the combined distance of the desired the depth 168 of the groove and desired diameter 166 of the rope seat 162. It may require several passes of the cutting bit to remove the material to reach the desired depth. In some examples, the first access aperture 132 and second access aperture 134 may be machined into the front face 136 to intersect with each end of the U-shaped groove 130. The initial depth of the first and second access apertures 132, 134 may be the desired final depth 170. In some examples, the formation of the first and second access apertures 132, 134 may be congruent with the diameter 166 of the rope seat 162 and may extend to the depth of the rope seat 162.

In some examples, the rope seat 162 within the thimble eye 110 may then be formed. A specialty fluted tool with a shape similar to that of a lollipop (i.e., a shaft narrower than the width 164 of the groove 130 and a bulbous cutting portion of the diameters 151, 153 of the first and second access apertures 132, 134) may be used to form the rope seat 162 within the thimble eye 110.

To begin the formation of the rope seat 162, the specialty tool may be inserted into the first access aperture 132, and the tool may begin rotating and moved vertically downward to the desired location of the rope seat 162. The tool may then be locked in a vertical position and moved laterally along the shape of the groove 130. The shape of the tool allows the rope seat 162 to be formed without widening the width 164 of the groove 130. The shaft of the specialty tool above the flute travels through the groove 130, while the flute removes material to form the rope seat 162.

As the specialty tool rotates and travels around the thimble eye 110, chips, shavings, and coolant are pushed out through the already formed groove 130 towards and out of the second access aperture 134 and or the second feed channel 160. The movement of the discarded material and coolant may help ensure that the rope seat 162 is smooth and free of burrs and blemishes that might damage the rope 106 when installed within the thimble 102 and the rope eye 108 later during use. In some examples, the first and second feed channels, 150, 152 and the portion of the rope seat 162 in the base 114 may be formed after the portion of the rope seat 162 is formed in the thimble eye 110. When the specialty tool reaches the second access aperture 134, the tool can be removed and the formation of the rope seat 162 within the thimble 102 is complete.

Assembly

In some examples, the bumper 104 may be coupled to the base 114 of the thimble 102 by manipulating the bumper 104 so that each post 180 aligns with a socket 140, and that the first feed channel 150 and second feed channel 152 are accessible through the rope aperture 118. The bumper 104 may then be pushed onto the base 114 so that the engagement surface 116 of the thimble 102 contacts the mating face 188 of the bumper 104. The ribs 190 on each post 180 may be compressed to fit through the neck openings 142 and be pushed towards the sockets 140 of the base 114. The ribs 190 may then expand once seated within the socket 140 in the portion having the diameter 143. The diameter of the ribs 190 may be larger than that of the diameter 141 of the neck openings 142 to help prevent the accidental removal of the bumper 104 from the thimble 102 during use.

In some examples, a first end of a synthetic rope 106 may then be fed into the first feed channel 150, and manipulated so that the rope 106 is fed through the rope seat 162 and back out of the thimble 102 through the second feed channel 152. In some examples, the rope 106 may first be fed through the second feed channel 152, through the rope seat 162 and back out through the first feed channel 150. Once the rope 106 has been installed within the thimble 102, it may be spliced with itself to form the rope eye 108. The chamfered surface 154 of each of the first and second feed channels 150, 152 may help prevent wear damage to the rope 106 as it enters and exits the thimble 102 and during use.

In some examples, a cap may be fitted into the groove 130 to prevent foreign materials and light from entering the thimble 102, thereby protecting the groove 130 and the rope eye 108 and the rope seat 162 from potential damage.

Use

In some examples, a first end of a rope 106 is coupled to a winch system and is fed through an opening in a fairlead of the winch system. In some examples, the winch system in mounted to a first movable object, such as a vehicle. A second end of the rope 106 may be connected to a thimble assembly 100. The thimble assembly 100 may be coupled to a second object, such as another vehicle, trailer, tree, etc. through the hardware mount aperture 112. The thimble assembly 100 may be used to couple the second object and the winch mounted on the first object in order to move the second object towards the first object, or to move the first object towards the second object. The thimble assembly 100 may also be used to couple the first object and the second object at a fixed distance.

When in use, the rope 106 may contact the fairlead opening. Any nicks, burrs, or damage to the fairlead opening might cause abrasions to the rope 106 when the rope 106 is being moved thorough the fairlead opening during the winching process. These abrasions may weaken the overall tensile strength of the rope 106, which may limit the use of a rope 106 in winching or towing applications or lead to a premature failure of the rope 106. The use of a thimble assembly 100 may help prevent damage to the rope 106. To position the thimble assembly 100 in a stored position, such as when the winch system is not being used, the winch system may be operated to remove slack in the rope 106 such that the thimble assembly 100 is positioned adjacent the fairlead opening. In these examples, the engagement surface 120 of the bumper 104 would be adjacent to and contact the fairlead. The bumper 104 may help protect the fairlead opening from damage that might result from the contact of the thimble 102 with the fairlead, thus preventing unnecessary damage to the rope. This may be a desirable attribute since, in some examples, the first object in which the winch system is installed on may be a vehicle and operated or moved without concern that the thimble assembly 100 may bounce, oscillate, bang, vibrate, or undesirably move with respect to the fairlead. Therefore, when the thimble assembly 100 is not in use, the thimble assembly 100 may be easily and safely stored adjacent the fairlead opening without subjecting the surface defining the fairlead opening to unnecessary damage. This protects both the fairlead and the rope 106.

In some examples, the bumper 104 is desirable, but not necessary and may not be used in all embodiments.

In some examples, the shape and size of the thimble 102, or the shape and size of the assembled thimble 102 and bumper 104 may prevent the rope eye 108 from slipping through the fairlead opening towards the winch or other system used to move the rope 106. In these examples, the prevention of a portion of the thimble assembly 100 from slipping through the fairlead opening further protects the fairlead opening from damage through nicks, burs, and dents, and may protect the rope 106 from abrasions caused by rubbing against the damaged fairlead opening, thereby helping maintain the tensile strength and capacity of the rope 106.

In some examples, the shape and size of the thimble 102 protects a substantial portion of the rope eye 108 installed within the thimble 102 from exposure to environmental damage. In some examples, a majority of the rope eye 108 installed within the thimble 102 is protected from exposure to ultraviolet radiation or abrasive materials in the environment. In some examples, the portion of the rope eye 108 that is unprotected is that which is exposed through the groove 130. The additional protection afforded to the rope eye 108 based upon the coverage of the majority of the rope eye 108 by the assembly 100 may help the increase the usage life of the rope 106, as a smaller portion of rope may be exposed to the damaging environment through light or abrasives, which may decrease the strength and/or usage life of the rope 106.

In some examples, a cap or gasket may be installed to fit the groove 130 to further protect against foreign debris from entering the groove 130 and to block UV radiation from the sun. If foreign debris enters the groove, it may run or abrade against the groove, the rope seat, or the rope eye 108. The interaction of the foreign debris with these components may cause the eventual damage to the rope eye 108, which may weaken the overall strength. In addition, the portion of the rope eye 108 exposed to sunlight through the groove 130 may also weaken the rope eye 108. The cap or gasket installed to fit the groove 130 may protect the rope eye 108 from this type of damage.

In some examples, the shape of the thimble 102 also protects the rope eye 108 from being crushed through multiple uses. This may help extend the life of the rope 106 when used with the assembly 100.

Figure 11:
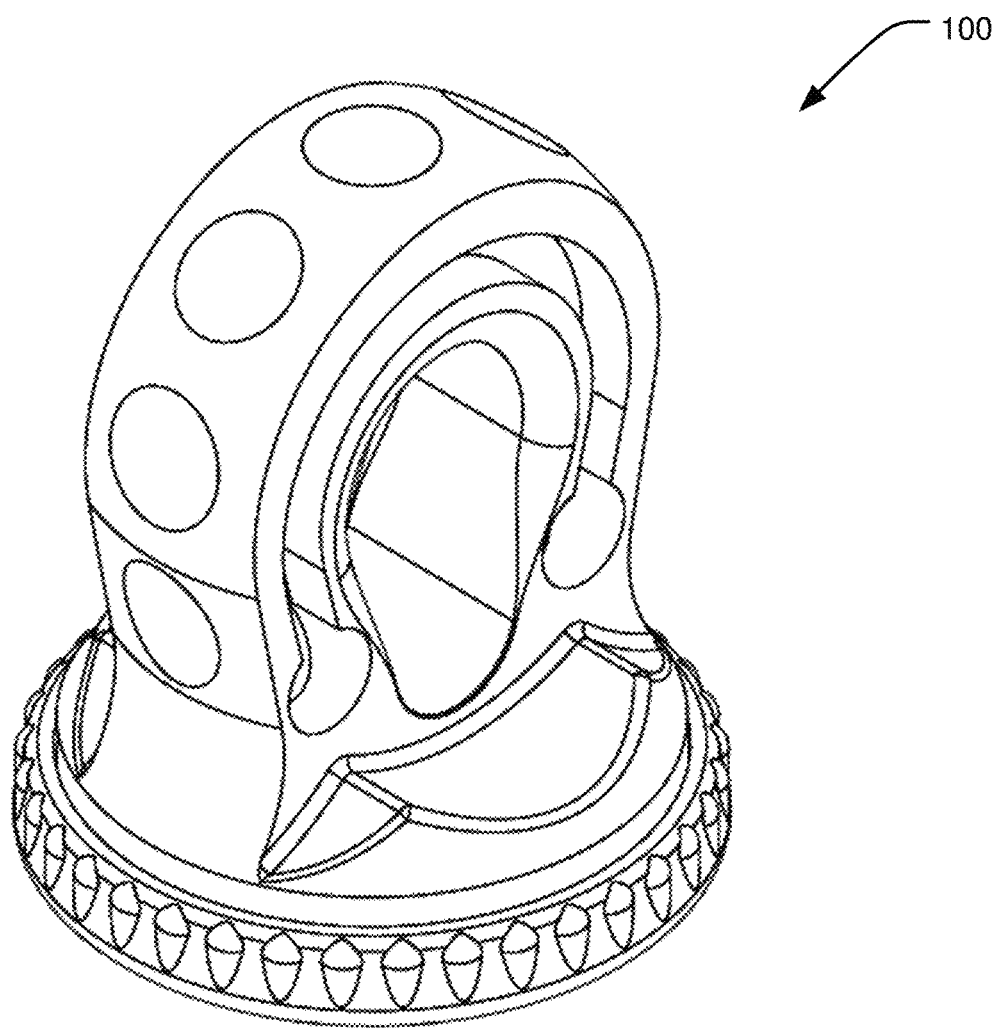
FIG. 11 is an isometric view of a thimble assembly.
Figure 12:
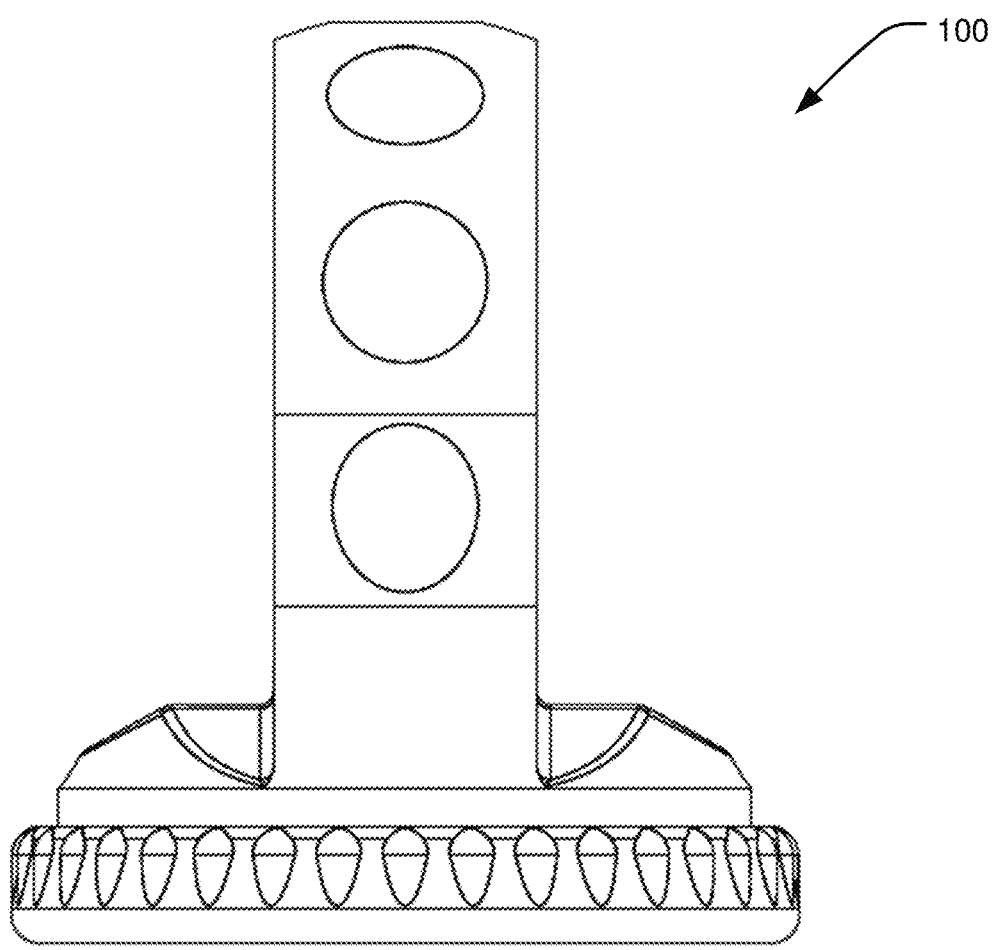
FIG. 12 is a front elevation view of the thimble assembly of FIG. 11.
Figure 13:
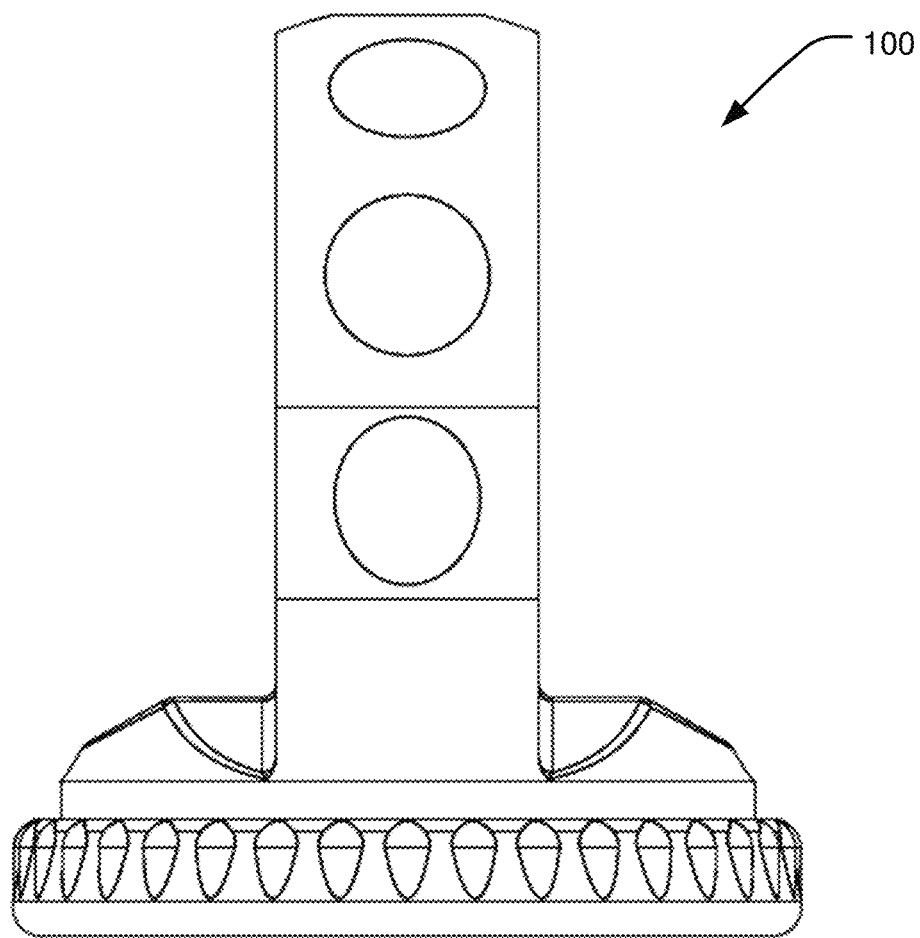
FIG. 13 is a rear elevation view of the thimble assembly of FIG. 11.
Figure 14:
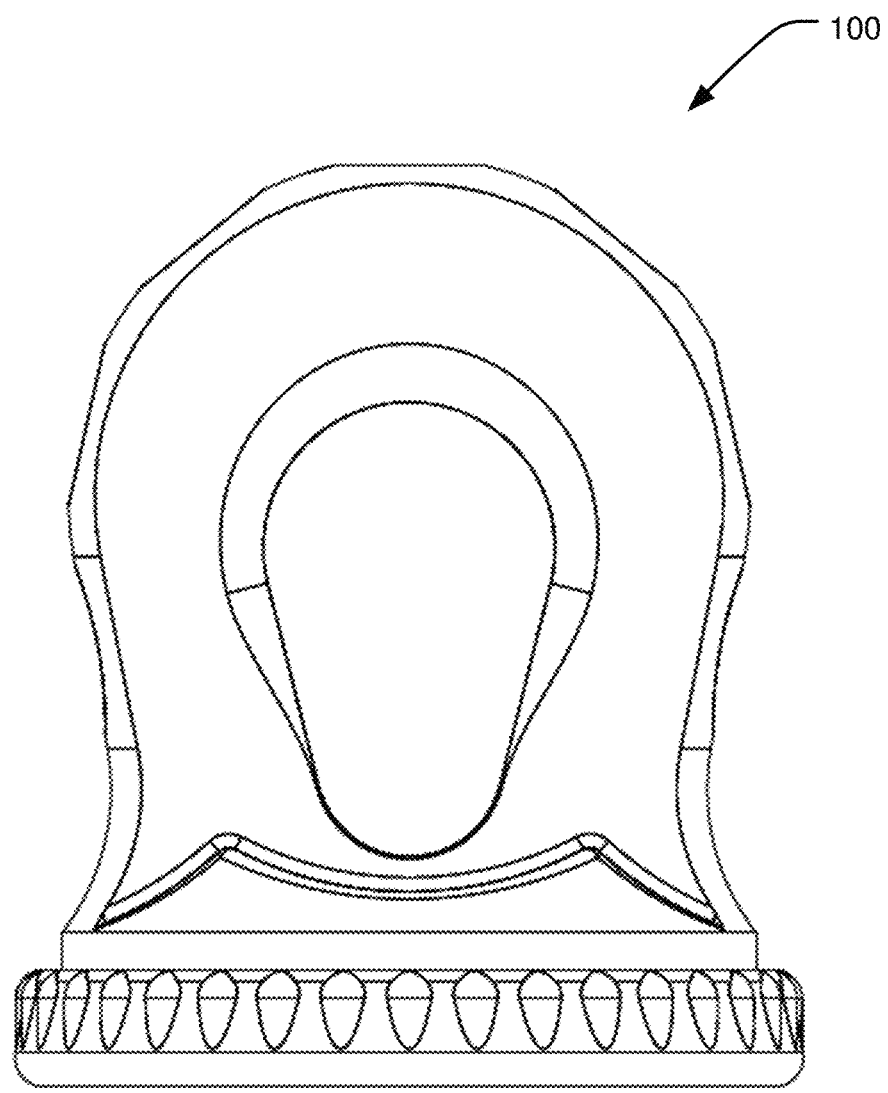
FIG. 14 is a left elevation view of the thimble assembly of FIG. 11.
Figure 15:
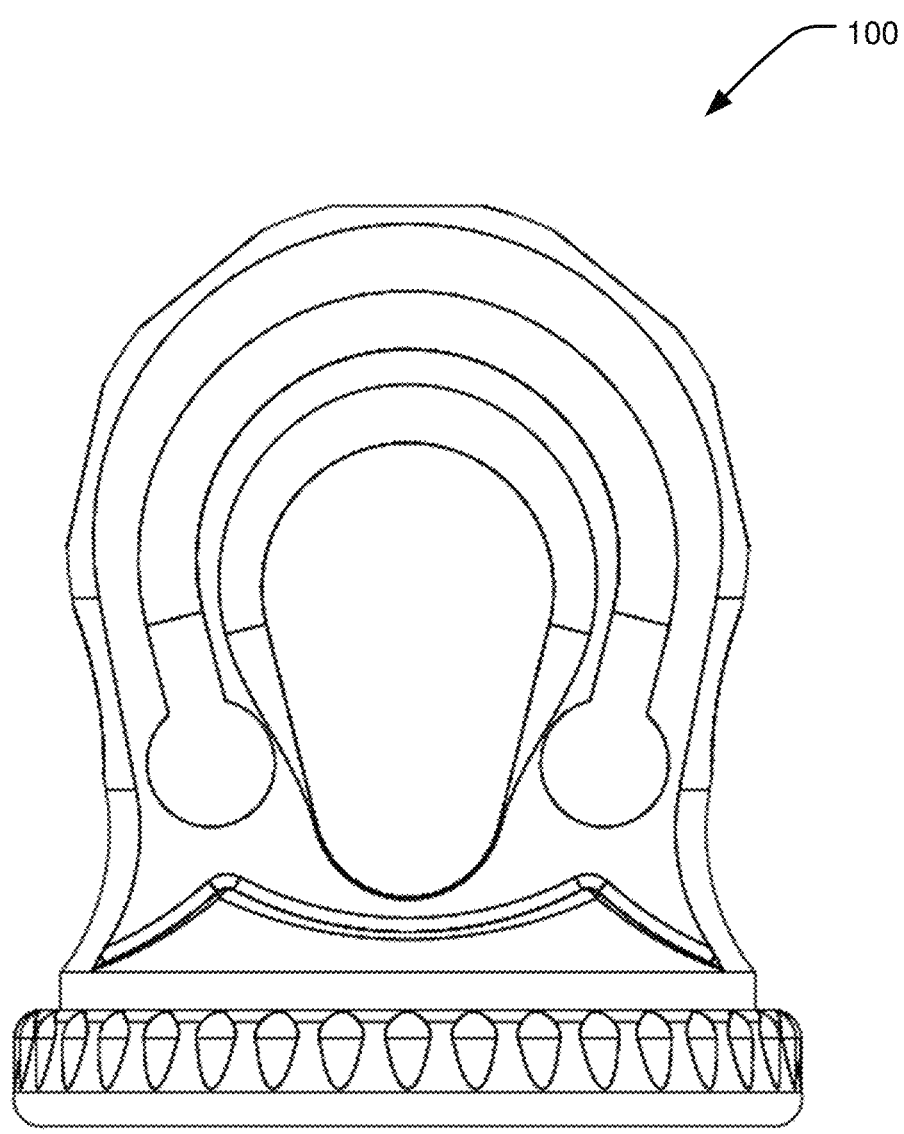
FIG. 15 is a right elevation view of the thimble assembly of FIG. 11.
Figure 16:
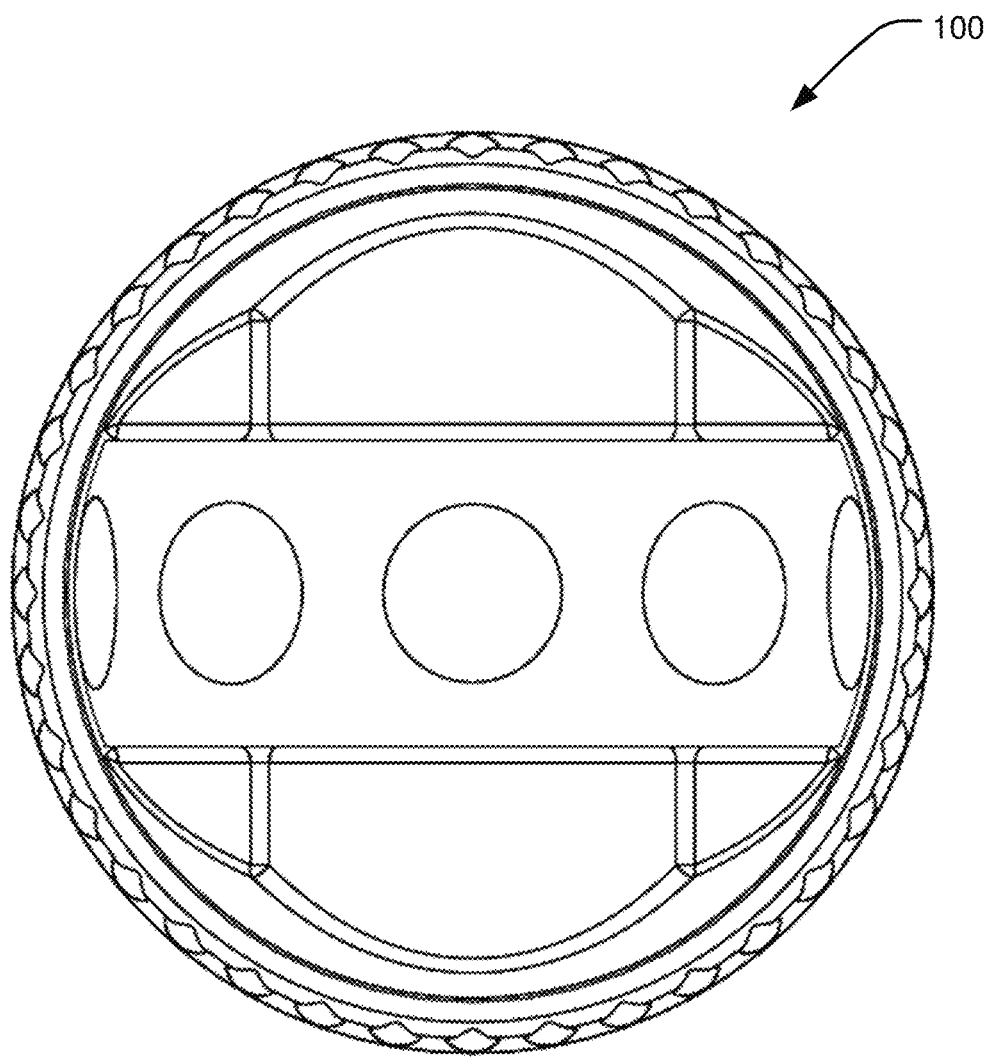
FIG. 16 is a top plan view of the thimble assembly of FIG. 11.
Figure 17:
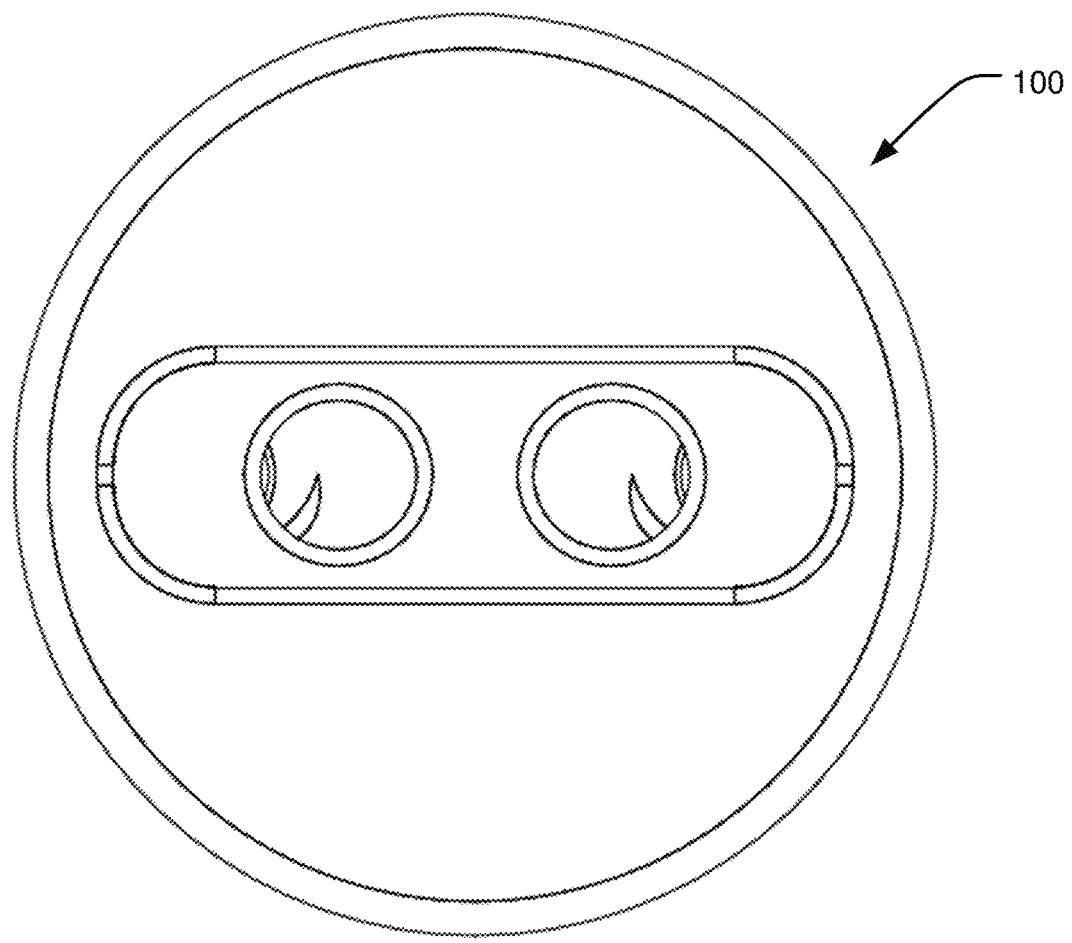
FIG. 17 is a bottom plan view of the thimble assembly of FIG. 11.

FIG. 11 is an isometric view of a thimble assembly. FIG. 12 is a front elevation view of the thimble assembly of FIG. 11. FIG. 13 is a rear elevation view of the thimble assembly of FIG. 11. FIG. 14 is a left elevation view of the thimble assembly of FIG. 11. FIG. 15 is a right elevation view of the thimble assembly of FIG. 11. FIG. 16 is a top plan view of the thimble assembly of FIG. 11. FIG. 17 is a bottom plan view of the thimble assembly of FIG. 11.

CONCLUSION

In some examples, the thimble assembly 100 may protect the rope 106 from environmental damage and distortion of the shape of the rope eye 108 shape, as well as protect the fairlead opening from damage when operating the winch to which the rope 106 and the thimble assembly 100 are coupled.

It should be noted that any of the features in the various examples and embodiments provided herein may be interchangeable and/or replaceable with any other example or embodiment. As such, the discussion of any component or element with respect to a particular example or embodiment is meant as illustrative only.

It should be noted that although the various examples discussed herein have been discussed with respect to clevis devices, the devices and techniques may be applied in a variety of applications, such as, but not limited to, towing, moving, winching, lifting, pulling, dragging, adjusting, or holding various items.

All directional references (e.g., upper, lower, upward, downward, left, right, leftward, rightward, top, bottom, above, below, vertical, horizontal, clockwise, and counterclockwise) are only used for identification purposes to aid the reader's understanding of the examples of the invention, and do not create limitations, particularly as to the position, orientation, or use of the invention unless specifically set forth in the claims. Joinder references (e.g., attached, coupled, connected, joined and the like) are to be construed broadly and may include intermediate members between the connection of elements and relative movement between elements. As such, joinder references do not necessarily infer that two elements are directly connected and in fixed relation to each other.

In some instances, components are described by reference to "ends" having a particular characteristic and/or being connected with another part. However, those skilled in the art will recognize that the embodiments are not limited to components which terminate immediately beyond their point of connection with other parts. Thus the term "end" should be broadly interpreted, in a manner that includes areas adjacent rearward, forward of or otherwise near the terminus of a particular element, link, component, part, member or the like.

In methodologies directly or indirectly set forth herein, various steps and operations are described in one possible order of operation but those skilled in the art will recognize the steps and operation may be rearranged, replaced or eliminated without necessarily departing from the spirit and scope of the present disclosure. It is intended that all matter contained in the above description or shown in the accompanying drawings shall be interpreted as illustrative only and not limiting. Changes in detail or structure may be made without departing from the broad understanding of the embodiments as defined in the appended claims.

What is claimed is:

1. A thimble apparatus for use with a rope, the apparatus comprising
    a thimble eye formed as a generally U-shaped shackle defining a center aperture therein with arms on opposing sides of the center aperture, and having an outer surface, a front face, and a rear face, and further defining
        a groove formed within the front face of the shackle generally in a shape of a U and having a width; and
        a rope seat formed within the shackle beneath the groove proximal to the rear face and having a diameter larger than the width of the groove, wherein the groove forms a passage to the rope seat from the front face along a length of the groove; and a base connected to ends of the arms of the shackle closing the center aperture and further defining
    a first feed channel formed as a first bore through the base that connects with a first end of the rope seat; and
    a second feed channel formed as a second bore through the base that connects with a second end of the rope seat.

2. The thimble apparatus of claim 1, wherein
the base further comprises a planar engagement surface aligned generally transverse to the ends of the arms and normal to the front face; and
the first feed channel and the second feed channel are formed in the planar engagement surface.

3. The thimble apparatus of claim 2 further comprising
a plurality of neck openings in the engagement surface of a first diameter; and
a plurality of sockets beneath respective neck openings of a second diameter greater than the first diameter.

4. The thimble apparatus of claim 3 further comprising
a bumper configured to mate with and protect the engagement surface of the base, wherein
a mating surface of the bumper comprises a plurality of posts extending normally from the mating surface and arranged and configured to align with, extend into, and interface with the plurality of neck openings and sockets to retain and affix the bumper to the engagement surface of the base.

5. The thimble apparatus of claim 2, wherein openings to the first feed channel and the second feed channel are both defined by a chamfered edge in the engagement surface.

6. The thimble apparatus of claim 1 further comprising
a first access aperture formed as a blind hole in the front face of the shackle at a first end of the groove; and
a second access aperture formed as a blind hole in the front face of the shackle at a second end of the groove.

7. The thimble apparatus of claim 6, wherein a diameter of each of the first and second access apertures is larger than the width of the groove.

8. The thimble apparatus of claim 6, wherein a diameter of each of the first and second access apertures is congruent with the diameter of the rope seat.

9. A thimble apparatus for reinforcing a spliced eye in a rope comprising
a thimble having
    a thimble eye formed as a generally U-shaped shackle defining a center aperture therein with arms on opposing sides of the center aperture, and having an outer surface, a front face, and a rear face, and further defining
    a groove formed within the front face of the shackle generally in a shape of a U and having a width; and
    a rope seat formed within the shackle beneath the groove proximal to the rear face and having a diameter larger than the width of the groove, wherein the groove forms a passage to the rope seat from the front face along a length of the groove;
a base connected to ends of the arms of the shackle closing the center aperture and further defining
    a first feed channel formed as a first bore through the base that connects with a first end of the rope seat;
    a second feed channel formed as a second bore through the base that connects with a second end of the rope seat; and
    a plurality of sockets formed as blind holes in an engagement surface of the base opposite from the ends of the arms of the shackle; and
a bumper having a plurality of posts extending normally from a surface thereof and defining a rope aperture; wherein
when the surface of the base defining the sockets and the bumper are coupled together, the plurality of posts align with the plurality of sockets, and the rope aperture aligns with the first feed channel and the second feed channel.

10. The apparatus of claim 9, wherein the engagement surface is planar and is aligned generally transverse to the ends of the arms and normal to the front face.

11. The apparatus of claim 9, wherein the groove has a width and the rope seat has a diameter larger than the width.

12. The apparatus of claim 9 further comprising
a first access aperture formed as a blind hole in the front face of the shackle at a first end of the groove; and
a second access aperture formed as a blind hole in the front face of the shackle at a second end of the groove in the front face.

13. The apparatus of claim 12, wherein the first access aperture is connected to the second access aperture by the groove.

* * * * *